US012608920B2

(12) United States Patent
Kawamura et al.

(10) Patent No.: US 12,608,920 B2

(45) Date of Patent: Apr. 21, 2026

---

(54) MACHINE LEARNING METHOD AND MACHINE LEARNING APPARATUS FOR FACIAL IMAGE BLENDING

(71) Applicants: Fujitsu Limited, Kawasaki (JP); OSAKA UNIVERSITY, Suita (JP)

(72) Inventors: Ryosuke Kawamura, Kawasaki (JP); Noriko Ikemoto Takemura, Suita (JP); Hajime Nagahara, Suita (JP)

(73) Assignees: Fujitsu Limited, Kawasaki (JP); OSAKA UNIVERSITY, Suita (JP)

( * ) Notice: Subject to any disclaimer, the term of this patent is extended or adjusted under 35 U.S.C. 154(b) by 205 days.

(21) Appl. No.: 18/228,679

(22) Filed: Aug. 1, 2023

(65) Prior Publication Data

US 2024/0153248 A1      May 9, 2024

(30) Foreign Application Priority Data

Nov. 8, 2022    (JP) ................................. 2022-178823

(51) Int. Cl.
| | |
|---|---|
| *G06V 10/774* | (2022.01) |
| *G06V 10/10* | (2022.01) |
| *G06V 10/74* | (2022.01) |
| *G06V 10/764* | (2022.01) |
| *G06V 10/82* | (2022.01) |
| *G06V 40/16* | (2022.01) |

(52) U.S. Cl.
CPC ............ *G06V 10/774* (2022.01); *G06V 10/16* (2022.01); *G06V 10/761* (2022.01); *G06V 10/764* (2022.01); *G06V 40/176* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2014/0153832 A1* | 6/2014 | Kwatra ................... | G06T 11/00 |
| | | | 382/195 |
| 2019/0122404 A1* | 4/2019 | Freeman ............... | G06V 40/161 |
| 2020/0043213 A1* | 2/2020 | Bao ....................... | G06V 40/193 |
| 2020/0097767 A1* | 3/2020 | Perry ................... | G06V 40/172 |

(Continued)

OTHER PUBLICATIONS

Li et al., "Blended Emotion in-the-Wild: Multi-label Facial Expression Recognition Using Crowdsourced Annotations and Deep Locality Feature Learning," International Journal of Computer Vision (2019) 127:884-906 (Year: 2019).*

(Continued)

*Primary Examiner* — Soo Shin
(74) *Attorney, Agent, or Firm* — XSENSUS LLP

(57) ABSTRACT

A storage unit stores therein first inference results respectively corresponding to a plurality of face images, which are output from a first model of outputting a first inference result in response to an input of a face image. A processing unit selects, from the plurality of face images, first and second face images whose distance calculated based their first inference results exceeds a threshold. The processing unit performs machine learning to train a second model of outputting a second inference result in response to an input of a face image, using a third face image obtained by combining the first and second face images.

15 Claims, 16 Drawing Sheets

(56) References Cited

U.S. PATENT DOCUMENTS

2020/0160582 A1* 5/2020 Bouaziz .............. G06V 40/176

OTHER PUBLICATIONS

Tang et al., "Expressive facial style transfer for personalized memesmimic," The Visual Computer (2019) 35:783-795 (Year: 2019).*
Paier et al., "Realistic Retargeting of Facial Video," CVMP '14, Nov. 13-14, 2014, London, United Kingdom (Year: 2014).*
Zhang et al., "mixup: Beyond Empirical Risk Minimization", arXiv:1710.09412v1 [cs.LG], Oct. 25, 2017, pp. 1-11.

* cited by examiner

FROM SMILE TO SERIOUS

GRADUALLY TO SMILE

MACHINE LEARNING METHOD AND MACHINE LEARNING APPARATUS FOR FACIAL IMAGE BLENDING

CROSS-REFERENCE TO RELATED APPLICATION

This application is based upon and claims the benefit of priority of the prior Japanese Patent Application No. 2022-178823, filed on Nov. 8, 2022, the entire contents of which are incorporated herein by reference.

FIELD

The embodiments discussed herein relate to a machine learning method and a machine learning apparatus.

BACKGROUND

Systems have been developed that recognize human facial expressions on the basis of images (face images) of human faces taken by cameras. In the recognition of facial expressions, a computer may use a model generated by machine learning, to estimate human emotions such as happiness, anger, fear, surprise, and others from face images. For example, the model is a neural network that is generated by deep learning (DL).

In this connection, for machine learning to build a model to be used for an object recognition task, there has been proposed a method of artificially generating new training data with both an alpha blending process of combining two images in a random ratio and a so-called mixup process of taking a weighted average of the labels of the images in the same ratio.

See, for example, Hongyi Zhang and three others, "mixup: Beyond Empirical Risk Minimization," [online], Oct. 25, 2017, arXiv:1710.09412 [cs.LG], [Searched on Aug. 16, 2022], Internet <URL: arxiv.org/pdf/1710.09412.pdf>

SUMMARY

According to one aspect, there is provided a non-transitory computer-readable storage medium storing a computer program that causes a computer to perform a process including: obtaining first inference results respectively corresponding to a plurality of face images, the first inference results being output from a first model of outputting each of the first inference results in response to an input of a corresponding one of the plurality of face images; selecting, from the plurality of face images, a first face image and a second face image whose distance calculated based on the first inference results corresponding to the first face image and the second face image exceeds a threshold; and performing machine learning to train a second model of outputting a second inference result in response to an input of each of the plurality of face images, using a third face image obtained by combining the first face image and the second face image.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In machine learning using face images as training data, annotation is costly, and it is difficult to scale up the training data. The less training data there is, the higher the risk of overfitting and the lower the generalization performance of a built model.

To avoid this, for example, new training data may be generated by combining two randomly-selected face images, as proposed earlier, to increase the amount of training data. However, depending on the task the model is designed for, there may be a small number of classes as the classification categories of face images. For example, in the case of a facial expression recognition task, there are relatively few types of emotions such as happiness and anger. In addition, a face image may contain the component of a class other than its main class, such as "surprise by fear."

For this reason, in the method of randomly selecting and combining two face images, for example, there is a possibility that similar face images are selected as combination targets from the perspective of class classification, which results in generating training data similar to the original training data. However, adding uniform training data would not be able to improve the generalization performance of the model.

The following describes embodiments with reference to the accompanying drawings.

First Embodiment

A first embodiment will be described.

Figure 1:
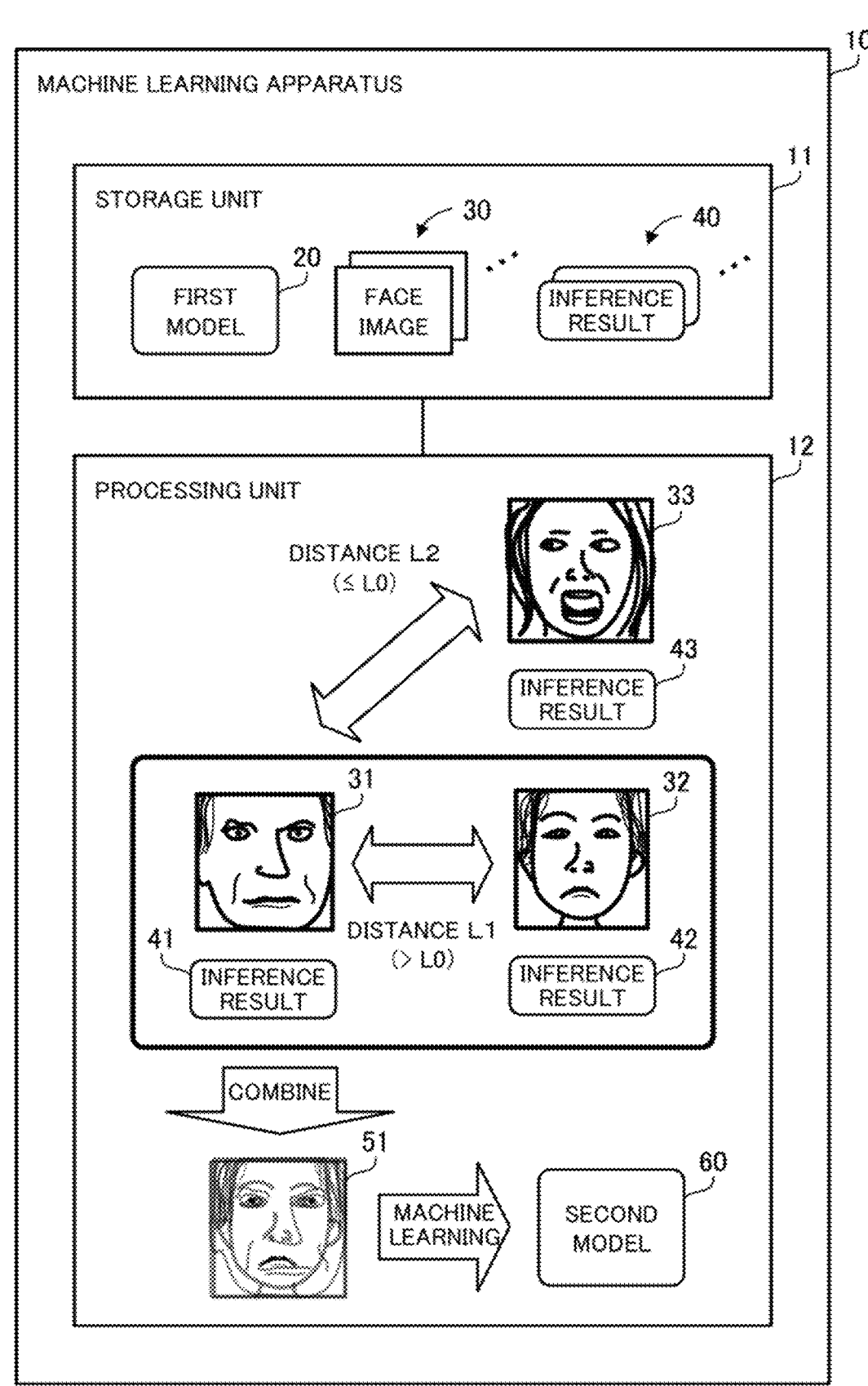
FIG. 1 is a view for describing an example of a machine learning apparatus according to a first embodiment.

FIG. 1 is a view for describing an example of a machine learning apparatus according to the first embodiment.

The machine learning apparatus 10 of the first embodiment performs machine learning to build a model of outputting, in response to an input of a face image, an inference result such as an emotion or another corresponding to the face image. The machine learning apparatus 10 may be called an information processing apparatus or a computer. The machine learning apparatus 10 may be a client apparatus or a server apparatus.

The machine learning apparatus 10 includes a storage unit 11 and a processing unit 12. The storage unit 11 may be a volatile semiconductor memory device such as a random access memory (RAM), or alternatively may be a non-volatile storage device such as a hard disk drive (HDD) or a flash memory. The processing unit 12 is a processor such as a central processing unit (CPU), a graphics processing unit (GPU), or a digital signal processor (DSP), for example. In this connection, the processing unit 12 may include an application specific electronic circuit such as an application specific integrated circuit (ASIC) or a field programmable gate array (FPGA). The processor runs programs stored in a memory (e.g., the storage unit 11) such as RAM, for example. A set of multiple processors may be called a "multiprocessor," or simply a "processor."

The storage unit 11 stores therein a first model 20, a face image group 30, and an inference result group 40. The first model 20 is a model that has been trained by machine learning in advance. The model may be called an inference model, a learned model, or a recognition model. The first model 20 outputs a first inference result in response to an input of a face image. For example, a neural network may be used as the first model 20. The face image group 30 is a set of face images that are input to the first model 20. The face images may be still images, or alternatively may be videos. The inference result group 40 is a set of first inference results output by the first model 20 in response to the face images.

There are a plurality of emotional elements such as happiness, anger, sadness, and enjoyment, and each first inference result may include a distribution of probabilities that each emotional element is included, which are estimated from an input face image, that is, a class classification result indicating the probability of each emotional element. In this case, the first inference result is represented by a vector with the probability of each emotional element as an element. In the case where a face image is a video including a predetermined number of frames, the first inference result may also include an attention indicating the weight of each frame. The attention may be called an attention level, a focus level, or another. The attention is an index that indicates how much each frame contributes to the inference. As an example, attention indicates the degree of facial expression change. Emotion is expressed as facial expression. Therefore, the greater the degree of facial expression change in a frame, the more the frame contributes to the emotion inference. In the case of using the attention, for example, the first inference result is represented by a vector with the degree of facial expression change in each frame as an element.

The processing unit 12 obtains the inference result group 40. The processing unit 12 may obtain the inference result group 40 by feeding each face image included in the face image group 30 to the first model 20. The processing unit 12 may obtain the inference result group 40 from a storage device that previously stores therein the face image group 30 and inference result group 40. In the latter case, the first model 20 does not need to be stored in the storage unit 11. The first model 20 may be stored in a storage device provided external to the machine learning apparatus 10.

The processing unit 12 selects, from the face image group 30, first and second face images whose distance calculated based on their first inference results exceeds a threshold. The threshold is preset and is taken as L0. The distance is the Euclidean distance between two vectors.

For example, the face image group 30 includes face images 31, 32, and 33. The inference result group 40 includes inference results 41, 42, and 43. The inference result 41 is an inference result obtained by the first model 20 in response to the face image 31. The inference result 42 is an inference result obtained by the first model 20 in response to the face image 32. The inference result 43 is an inference result obtained by the first model 20 in response to the face image 33.

For example, the processing unit 12 calculates a distance L1 on the basis of the inference results 41 and 42. The distance L1 is greater than the threshold L0. In this case, the processing unit 12 selects the pair of face images 31 and 32 as combination targets.

In addition, the processing unit 12 calculates a distance L2 on the basis of the inference results 41 and 43. The distance L2 is less than or equal to the threshold L0. In this case, the processing unit 12 does not select the pair of face images 31 and 33 as combination targets. In the same manner, the processing unit 12 may select a pair of face images 32 and 33 as combination targets, depending on the result of comparing the distance based on the inference results 42 and 43 with the threshold L0.

The processing unit 12 performs machine learning to train a second model 60 of outputting a second inference result in response to an input of a face image, using a third face image obtained by combining the first and second face images. For example, the processing unit 12 combines the selected face images 31 and 32 to generate a face image 51. The processing unit 12 then performs the machine learning to train the second model 60 using the face image 51. The machine learning for the second model 60 uses each face image included in the face image group 30 as well. For example, a neural network is used as the second model 60. The model structure of the second model 60 may be the same as or different from that of the first model 20. A second inference result the second model 60 outputs may include information indicating an emotion estimated from a face image.

Alpha blending may be used for combining the face images 31 and 32. A vector with the pixel values of one image is taken as X1, a vector with the pixel values of the other image is taken as X2, and the ratio of the pixel values of the one image in the alpha blending is taken as $\lambda$ ($0<\lambda<1$). In this case, the alpha blending is defined by $\lambda X1+(1-\lambda)X2$. The label of the one image is taken as y1, and the label of the other image is taken as y2. Then, the label y of the composite image is calculated as $y=\lambda y1+(1-\lambda)y2$. The labels are information that is used together with the face images as training data. A label is given to each face image in advance. A label may be a distribution of emotional elements that the first model 20 outputs, or alternatively may be a distribution of emotional elements different from those emotional elements.

As described above, the machine learning apparatus 10 of the first embodiment obtains first inference results respectively corresponding to a plurality of face images, which are output from the first model of outputting a first inference result in response to an input of a face image. The machine learning apparatus 10 then selects, from the plurality of face images, first and second face images whose distance calculated based on their first inference results exceeds a threshold. Using a third face image obtained by combining the first and second face images, the machine learning apparatus 10 performs the machine learning to train the second model of outputting a second inference result in response to an input of a face image.

The above approach improves the generalization performance of the model. By selecting and combining a pair of face images whose distance calculated based on their first inference results is somewhat large, it becomes possible to prevent a pair of similar face images from being combined. Therefore, it is possible to increase the diversity of the training data efficiently. This in turn improves the identification performance of the model generated by the machine learning, for data that is not included in the training data, i.e., improves the generalization performance of the model.

In this connection, each first inference result may include a class classification result indicating the probability of each of the plurality of emotional elements estimated from a face image. This makes it possible to select, as combination targets, face images with different class classification results regarding the plurality of emotional elements, which leads to increasing the diversity of the training data efficiently. This results in improving the generalization performance of the second model.

Furthermore, each face image may be a video capturing facial expression change. In addition, each first inference result may include an attention indicating the weight of each frame included in a face image. This makes it possible to select, as combination targets, face images with different temporal changes in each frame, which leads to increasing the diversity of the training data efficiently. This results in improving the generalization performance of the second model.

In addition, in the case where each face image is a video capturing facial expression change, each first inference result may also include a class classification result indicating the probability of each of the plurality of emotional elements estimated from a face image. In this case, the processing unit 12 may select, as combination targets, first and second face images whose first distance calculated based on their class classification results exceeds a first threshold and whose second distance calculated based on their values of the attention (attention values) exceeds a second threshold. By doing so, it becomes possible to increase the diversity of the training data efficiently. This results in improving the generalization performance of the second model.

Furthermore, the processing unit 12 may generate a third face image by performing the alpha blending of first and second face images using the first weight of the first face image and the second weight of the second face image. The processing unit 12 may generate the third label of the third face image by calculating the weighted average of the first label of the first face image and the second label of the second face image using the first weight and the second weight. Then, the processing unit 12 may perform the machine learning to train the second model using the training data including the third face image and the third label. This makes it possible to augment the training data efficiently and to improve the generalization performance of the second model.

Second Embodiment

A second embodiment will be described.

Figure 2:
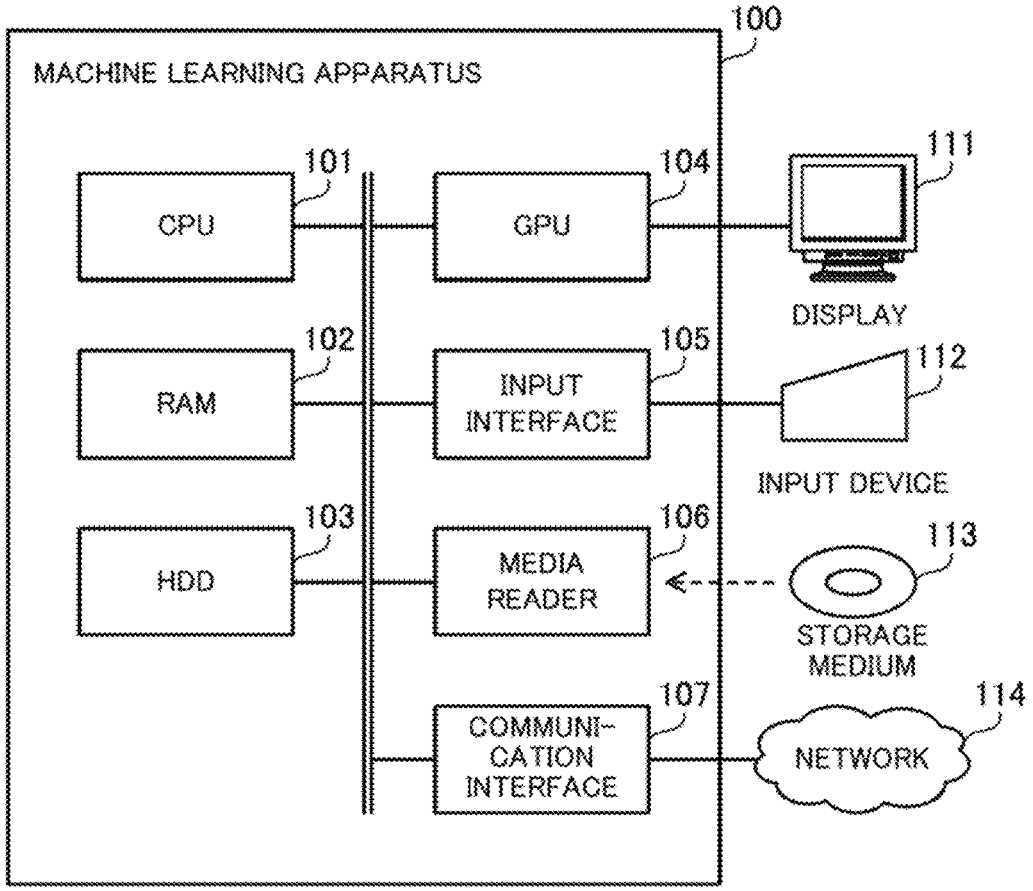
FIG. 2 illustrates an example of the hardware configuration of a machine learning apparatus according to a second embodiment.

FIG. 2 illustrates an example of the hardware configuration of a machine learning apparatus according to the second embodiment.

The machine learning apparatus 100 includes a CPU 101, a RAM 102, an HDD 103, a GPU 104, an input interface 105, a media reader 106, and a communication interface 107. These hardware units provided in the machine learning apparatus 100 are connected to a bus inside the machine learning apparatus 100. The CPU 101 corresponds to the processing unit 12 of the first embodiment. The RAM 102 or the HDD 103 corresponds to the storage unit 11 of the first embodiment.

The CPU 101 is a processor that executes program instructions. The CPU 101 loads at least part of a program and data from the HDD 103 to the RAM 102 and executes the program. In this connection, the CPU 101 may include a plurality of processor cores. The machine learning apparatus 100 may include a plurality of processors. The processing that will be described below may be performed in parallel by the use of a plurality of processors or processor cores. A set of multiple processors may be called a "multiprocessor," or simply a "processor."

The RAM 102 is a volatile semiconductor memory device that temporarily stores therein programs to be executed by the CPU 101 and data to be used by the CPU 101 in processing. The machine learning apparatus 100 may include a different type of memory device than RAM or a plurality of memory devices.

The HDD 103 is a non-volatile storage device that stores therein software programs such as an operating system (OS), middleware, and application software, and data. The machine learning apparatus 100 may include another type of storage device such as a flash memory or a solid state drive (SSD), or a plurality of non-volatile storage devices.

The GPU 104 outputs images to a display 111 connected to the machine learning apparatus 100 in accordance with commands from the CPU 101. As the display 111, a desired type of display such as a cathode ray tube (CRT) display, a liquid crystal display (LCD), a plasma display, or an organic electro-luminescence (OEL) display may be used.

The input interface 105 receives an input signal from an input device 112 connected to the machine learning apparatus 100, and outputs the input signal to the CPU 101. As the input device 112, a pointing device such as a mouse, a touch panel, a touchpad, or a track ball, a keyboard, a remote controller, a button switch, or anther may be used. In addition, plural types of input devices may be connected to the machine learning apparatus 100.

The media reader 106 is a reading device that reads programs and data from a storage medium 113. Examples of the storage medium 113 include a magnetic disk, an optical disc, a magneto-optical (MO) disk, and a semiconductor memory. Magnetic disks include flexible disks (FDs) and HDDs. Optical discs include compact discs (CDs) and digital versatile discs (DVDs).

The media reader 106 copies, for example, a program and data read from the storage medium 113 to the RAM 102, HDD 103, or another storage medium. The read program may be run by the CPU 101, for example. In this connection, the storage medium 113 may be a portable storage medium and may be used for distribution of programs and data. In addition, the storage medium 113 and HDD 103 may be called computer-readable storage media.

The communication interface 107 is connected to a network 114 to communicate with other information processing apparatuses over the network 114. The communication interface 107 may be a wired communication interface that is connected to a switch, a router, or another wired communication device, or alternatively may be a wireless communication interface that is connected to a base station, an access point, or another wireless communication device.

Figure 3:
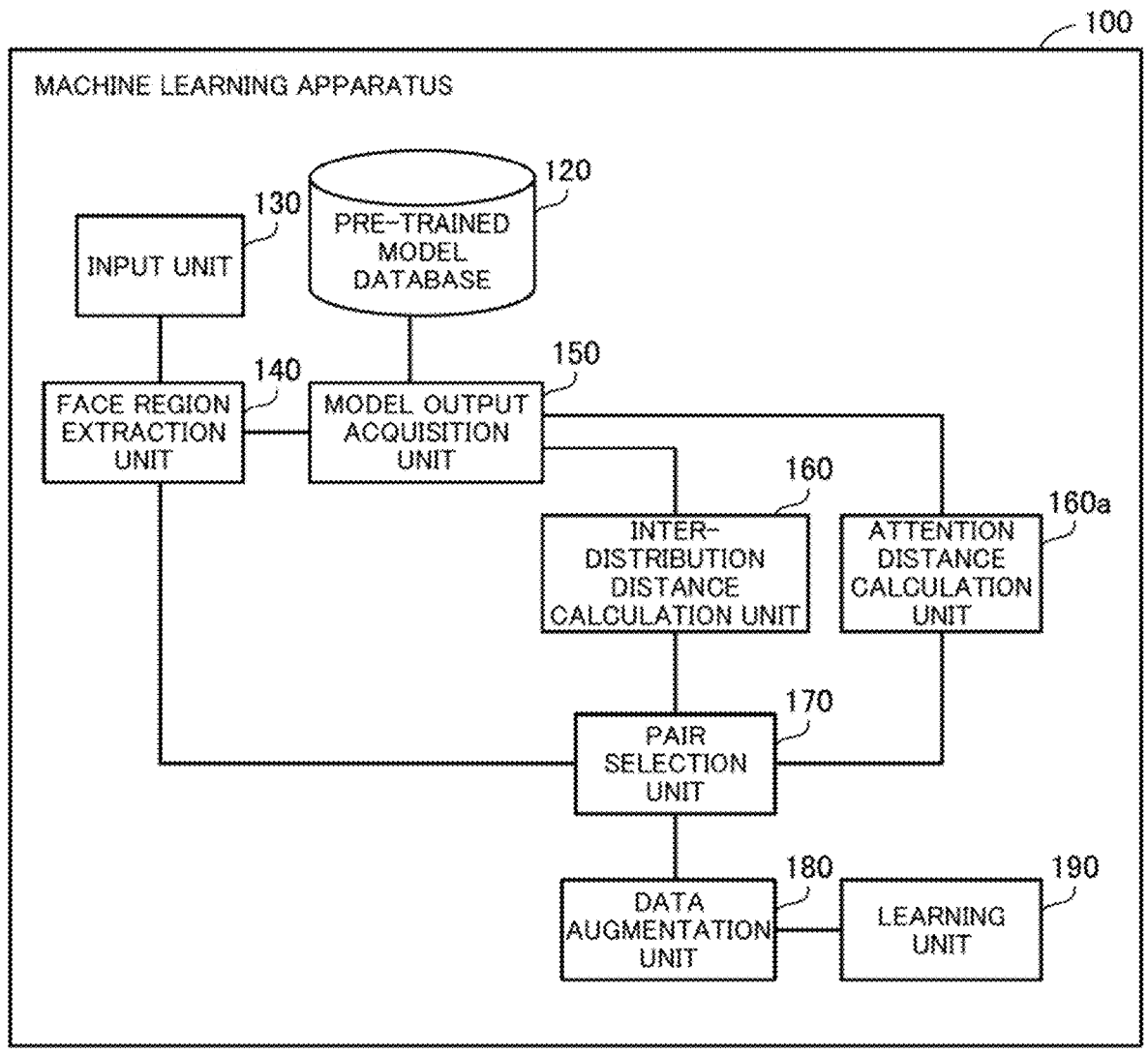
FIG. 3 is a block diagram illustrating an example of functions of the machine learning apparatus.

FIG. 3 is a block diagram illustrating an example of functions of the machine learning apparatus.

The machine learning apparatus 100 performs machine learning to build a model of estimating a human emotion in response to an input of a video of a human face. The video of the human face is called a face video. The number of frames in the face video is determined in advance. For example, the number of frames in a single face video is approximately 8 to 20. For example, the face video is produced in advance by thinning out some frames from the frames included in a video capturing facial expression change over a predetermined period of time. The face video is an example of the face images of the first embodiment.

The machine learning apparatus 100 includes a pre-trained model database 120, an input unit 130, a face region extraction unit 140, a model output acquisition unit 150, an inter-distribution distance calculation unit 160, an attention distance calculation unit 160a, a pair selection unit 170, a data augmentation unit 180, and a learning unit 190.

The pre-trained model database 120 is implemented by using a storage space of the RAM 102 or HDD 103, for example. The input unit 130, face region extraction unit 140, model output acquisition unit 150, inter-distribution distance calculation unit 160, attention distance calculation unit 160a, pair selection unit 170, data augmentation unit 180, and learning unit 190 are implemented by the CPU 101 executing programs, for example.

The pre-trained model database 120 stores therein a pre-trained model. The pre-trained model is a facial expression recognition model that has been built by machine learning in advance. The pre-trained model outputs a distribution of emotional elements such as happiness, anger, sadness, and enjoyment according to the facial expression change in a face video given as an input. In addition, the pre-trained model outputs attention information indicating the attention of each frame of the input face video. As described earlier, the attention is an index indicating how much each frame contributes to the inference. The attention indicates the degree of facial expression change. The greater the degree of facial expression change in a frame, the more the frame contributes to the inference. Emotion is expressed as facial expression. Therefore, the greater the degree of facial expression change in a frame, the more the frame tends to contribute to facial expression recognition and emotion inference based on the facial expression recognition.

In this connection, the pre-trained model may be generated by the machine learning apparatus 100 using sets of face video and label prepared in advance.

The input unit 130 accepts an input of a face video that is used as training data for a new recognition model, and outputs the face video to the face region extraction unit 140. The input unit 130 receives a plurality of face videos prepared in advance and outputs the face videos to the face region extraction unit 140. The plurality of face videos may be input externally, or alternatively may be stored in the RAM 102 or HDD 103 in advance.

The face region extraction unit 140 extracts a region of a human face, i.e., a face region from each frame of an input face video. For example, the face region extraction unit 140 is implemented by using a face recognition model of recognizing a face region in an image. The face region extraction unit 140 processes each frame of the face video to remove information other than the face region therefrom. The face region extraction unit 140 processes each of the plurality of input face videos in this manner and outputs the processed face videos to the model output acquisition unit 150 and pair selection unit 170.

The model output acquisition unit 150 feeds a face video to the pre-trained model stored in the pre-trained model database 120 and obtains an inference result output from the pre-trained model. The inference result includes a distribution of emotional elements and attention information. The distribution of emotional elements is represented by a vector with the probability of each emotional element such as enjoyment and anger as an element. The attention information is represented by a vector with the degree of facial expression change in each frame as an element. The model output acquisition unit 150 outputs the distribution of emotional elements obtained for each face video to the inter-distribution distance calculation unit 160. The model output acquisition unit 150 outputs the attention information obtained for each face video to the attention distance calculation unit 160a.

The inter-distribution distance calculation unit 160 calculates the inter-distribution distance of two certain face videos on the basis of the distributions of emotional elements obtained from the pre-trained model for the plurality of face videos. The inter-distribution distance is the distance between two distributions of emotional elements corresponding to the two face videos. The inter-distribution distance is the Euclidean distance calculated from two vectors representing the two distributions of emotional elements. The inter-distribution distance calculation unit 160 outputs the calculated inter-distribution distance to the pair selection unit 170.

The attention distance calculation unit 160a calculates the attention distance of two certain face videos on the basis of the attention information obtained from the pre-trained model for the plurality of face videos. The attention distance is the distance between two pieces of attention information corresponding to the two face videos. The attention distance is the Euclidean distance calculated from two vectors representing the two pieces of attention information. The attention distance calculation unit 160a outputs the calculated attention distance to the pair selection unit 170.

The pair selection unit 170 selects a pair of face videos as combination targets, on the basis of the inter-distribution distance and attention distance calculated for each pair of two face videos. More specifically, the pair selection unit 170 selects two face videos whose inter-distribution distance and attention distance both exceed the corresponding preset thresholds, as a pair of combination targets. In this connection, the pair selection unit 170 may select, as a pair of combination targets, two face videos at least one of whose inter-distribution distance and attention distance exceeds the corresponding preset threshold. The pair selection unit 170 outputs the two face videos selected as a pair of combination targets to the data augmentation unit 180.

The pair selection unit 170 may select a pair of face videos in the following manner. A distribution that is a recognition result obtained by the pre-trained model is taken as a vector y. In addition, the attention information (frame attention) of a face video is taken as a vector a. With the pre-trained model, vectors $y_1$ and $a_1$ are obtained for a face video $x_1$, and vectors $y_2$ and $a_2$ are obtained for a face video $x_2$.

With respect to $(x_1, y_1, a_1)$, the pair selection unit 170 selects $(x_2, y_2, a_2)$ satisfying at least one of $D_{th1}{}^u>d(y_1, y_2)>D_{th1}{}^b$ and $D_{th2}{}^u>d(a_1, a_2)>D_{th2}{}^b$ Here, $D_{th1}{}^b$ is a threshold preset for the inter-distribution distance, and $D_{th1}{}^u$ is an upper limit preset for the inter-distribution distance. In this connection, $D_{th1}{}^u$ does not need to be set.

In addition, $D_{th2}{}^b$ is a threshold preset for the attention distance, and $D_{th2}{}^u$ is an upper limit preset for the attention distance. In this connection, $D_{th2}{}^u$ does not need to be set. In addition, $(y_1, y_2)$ is the Euclidean distance between the vectors $y_1$ and $y_2$, and $d(a_1, a_2)$ is the Euclidean distance between the vectors $a_1$ and $a_2$.

The data augmentation unit 180 augments training data by combining two face videos selected as a pair of combination targets. For combining the face videos, the alpha blending using the mixup method may be used. As the label of the composite face video obtained by the combining, a weighted average of the labels of the combination-target face videos in the same ratio $\lambda$ $(0<\lambda<1)$ as used in the alpha blending is used.

The learning unit 190 performs machine learning to build a new recognition model for facial expression recognition, using the face videos output from the face region extraction unit 140 and the composite face videos obtained by the combining of the data augmentation unit 180. The model structure of the new recognition model may be the same as or different from that of the pre-trained model. The new recognition model receives a face video as an input and outputs information indicating an emotion estimated from the face video.

The following describes a distribution of emotional elements corresponding to a face video.

Figure 4:
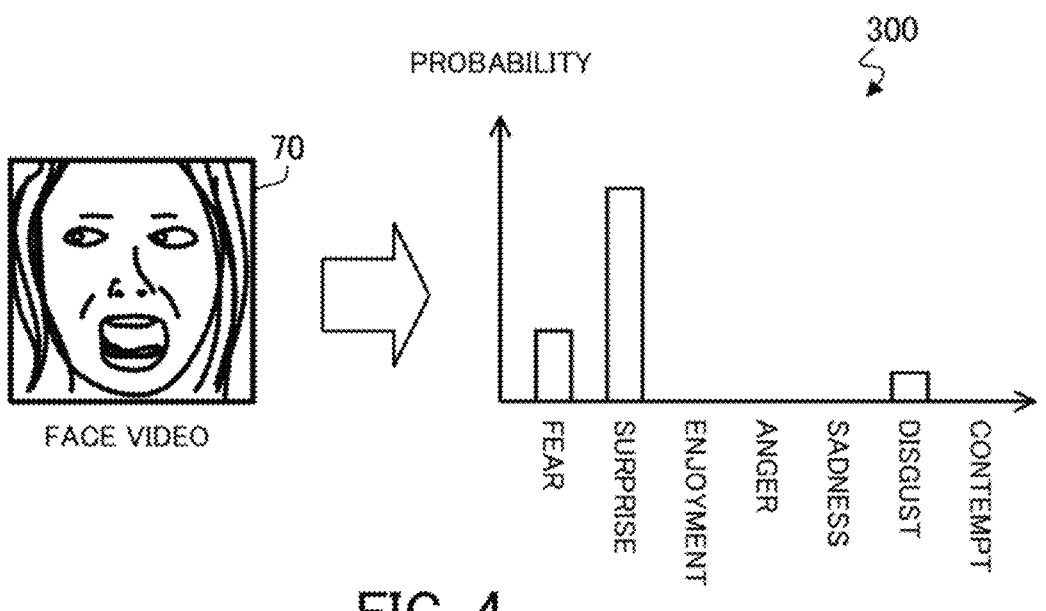
FIG. 4 illustrates an example of a distribution of emotional elements corresponding to a face video.

FIG. 4 illustrates an example of a distribution of emotional elements corresponding to a face video.

A face video 70 is a video capturing change in the facial expression of a certain person. A distribution 300 is an example of a distribution of emotional elements corresponding to the face video 70. There are a plurality of emotional elements, and the distribution 300 is a class classification result indicating the probability of each emotional element. Examples of the emotional elements include fear, surprise, enjoyment, anger, sadness, disgust, and contempt. In the distribution 300, the horizontal axis represents these emotional elements, whereas the vertical axis represents the probabilities that each emotional element is included. Referring to the example of the face video 70 and distribution 300, the probability that the emotional element "surprise" is included is the highest, the probability that the emotional element "fear" is included is the second highest, and the probability that the emotional element "disgust" is included is the third highest. For example, in the case of classifying the face video 70 into one of the classes (facial expression classes) corresponding to the above seven emotional elements, the face video 70 is classified into a facial expression class "surprise" on the basis of the distribution 300.

The following describes how the machine learning apparatus 100 performs machine learning for facial expression recognition.

Figure 5:
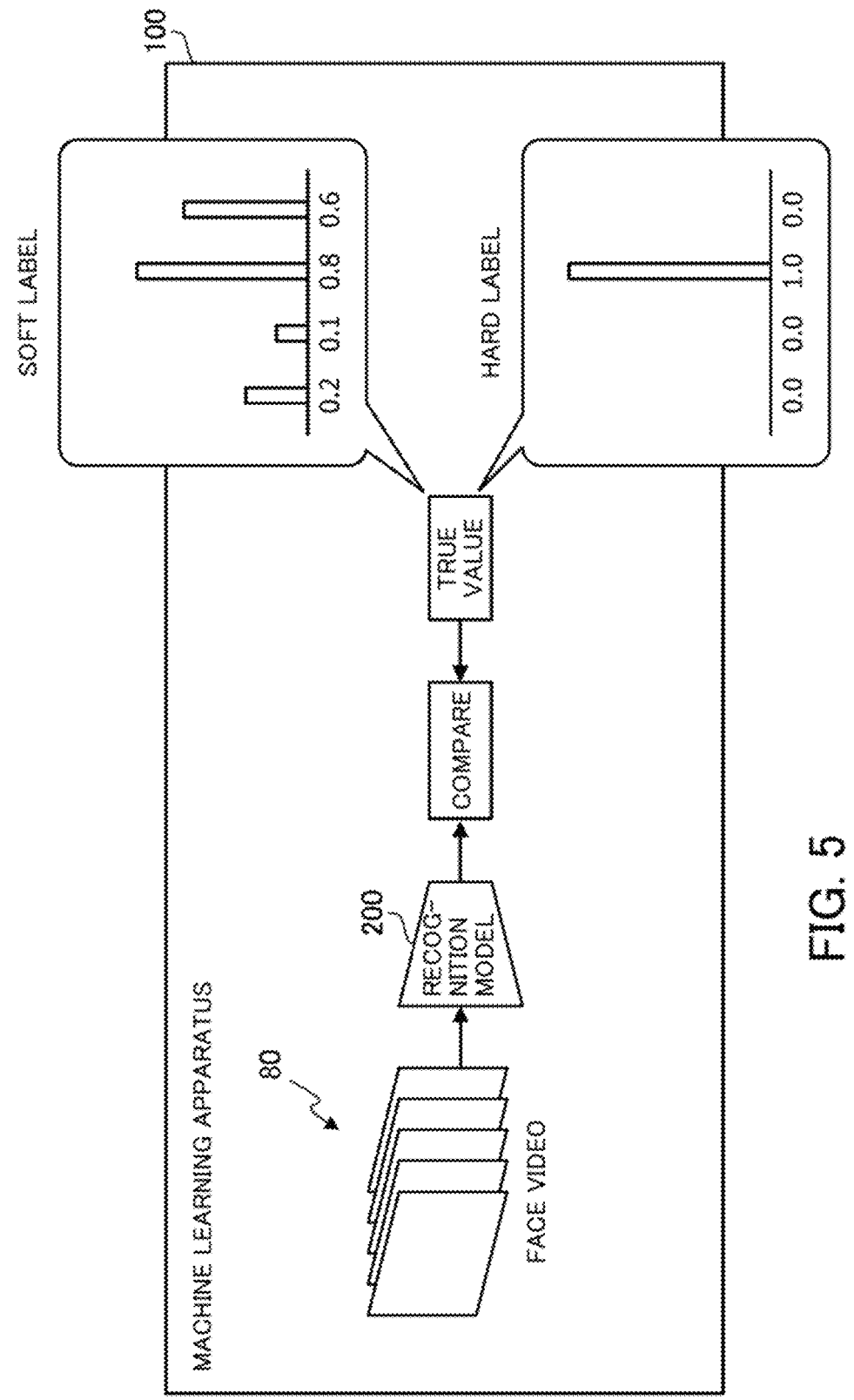
FIG. 5 illustrates an example of machine learning.

FIG. 5 illustrates an example of machine learning.

The machine learning apparatus 100 performs machine learning to train a recognition model 200 using training data including a face video 80 and a label given to the face video 80. The label is given to the face video 80 in advance. The label indicates a true value that the recognition model 200 is expected to output in response to the face video 80. A process of giving the label to the face video 80 is called an annotation. In addition, an operator who performs the annotation is called an annotator. The label may be a soft label or a hard label. In the case of the soft label, the ratio of the probabilities that the emotional element corresponding to each classification category is included is given. In the case of the hard label, a one-hot vector is given to specify which emotional element a face video is classified to as a classification category. The training data may be called teacher data. The annotation for one face video is performed on the basis of a voting result by a plurality of annotators. Therefore, in building a facial expression recognition model, the annotation is costly.

The following describes the pre-trained model stored in the pre-trained model database 120.

Figure 6:
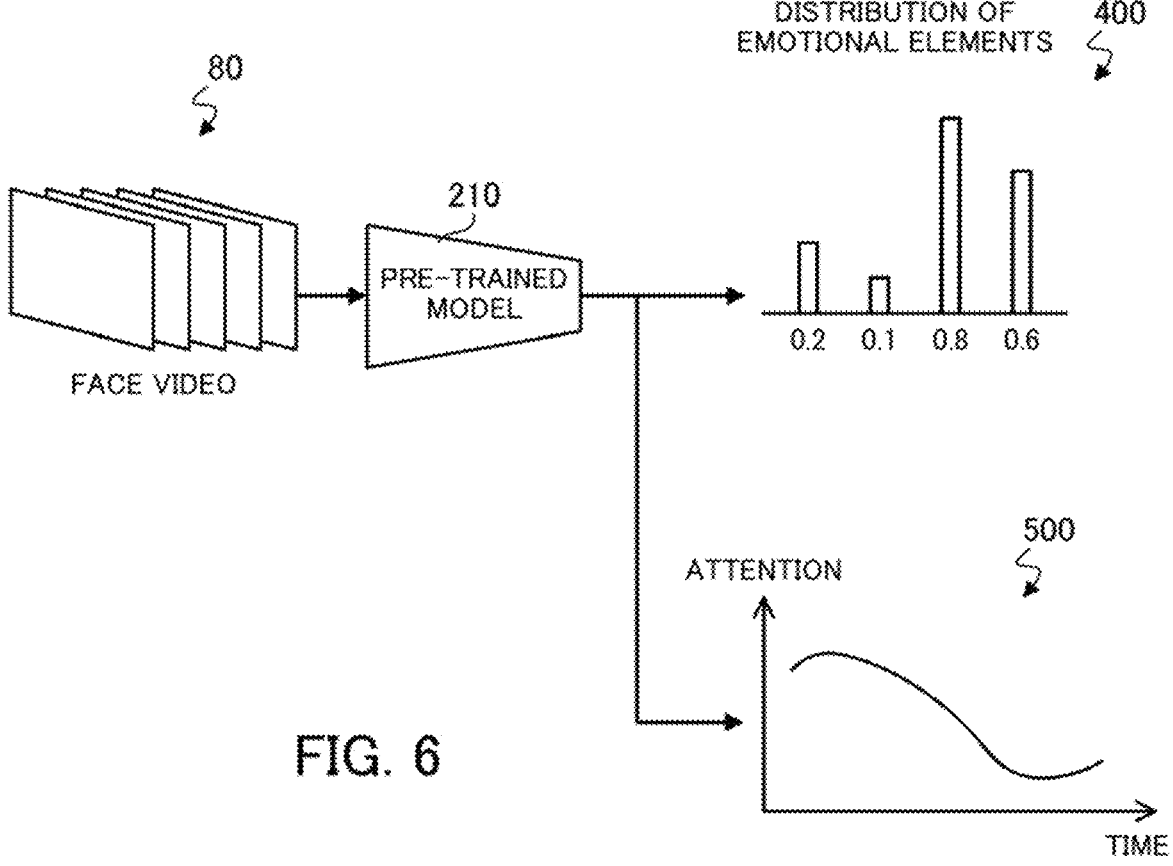
FIG. 6 illustrates examples of outputs of a pre-trained model.

FIG. 6 illustrates examples of outputs of a pre-trained model.

A pre-trained model 210 receives the face video 80 as an input, and outputs a distribution 400 of emotional elements and attention information 500. In FIG. 6, the vertical axis and the names of the emotional elements are not indicated in the distribution 400 of emotional elements, and the ratio (of the probabilities) of emotional elements is indicated in the horizontal axis. The numerical values arranged in the horizontal axis correspond to the emotional elements such as fear, surprise, enjoyment, anger, and others, in order from left to right.

The attention information 500 indicates the attention of each frame included in the face video 80. In the attention information 500, the horizontal axis represents time, whereas the vertical axis represents an attention, i.e., the degree of change in each frame included in the face video 80.

The following describes the model structure of the pre-trained model 210.

Figure 7:
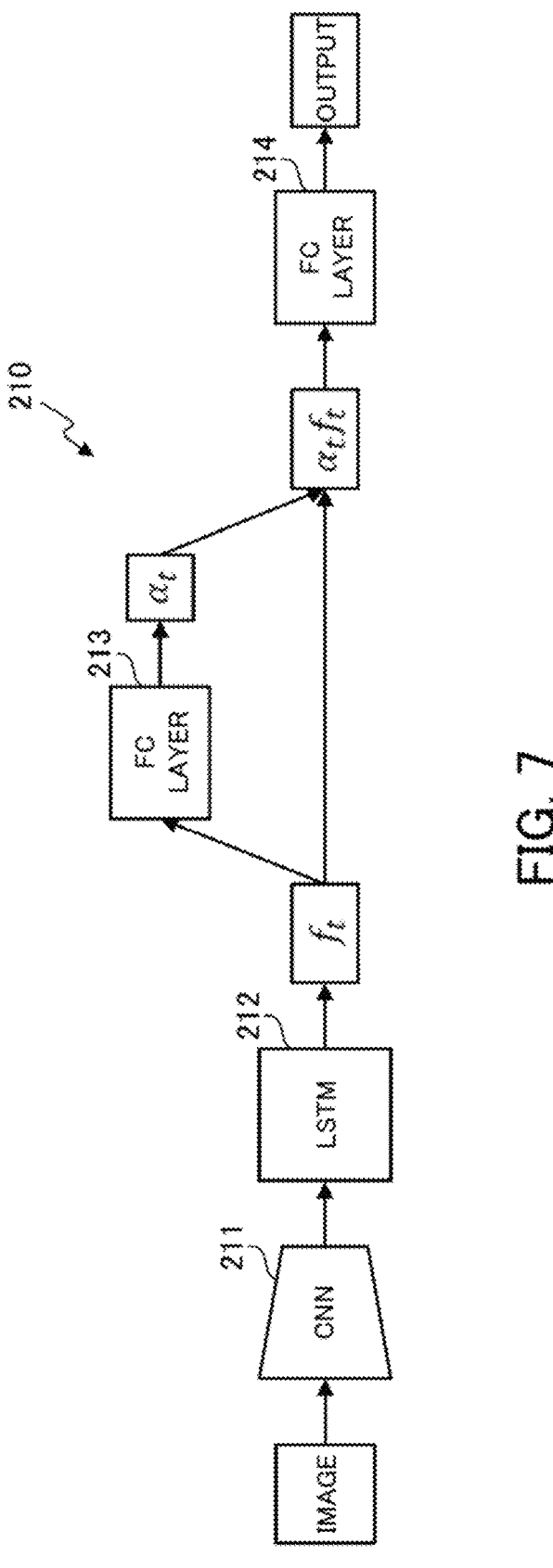
FIG. 7 illustrates an example of the model structure of the pre-trained model.

FIG. 7 illustrates an example of the model structure of the pre-trained model.

The pre-trained model 210 includes a convolutional neural network (CNN) 211, long short term memory (LSTM) 212, and fully connected (FC) layers 213 and 214. The pre-trained model 210 processes the images corresponding to the frames included in a face video in order of frames. In FIG. 7, t denotes a frame number.

The CNN 211 performs a convolutional process on an input frame, and outputs the resultant to the LSTM 212.

The LSTM 212 outputs an m-dimensional feature vector $f_t$ on the basis of the result of performing the convolutional process on the current frame t. The LSTM 212 reflects the influences of the past frames on $f_t$. The LSTM 212 outputs $f_t$.

The FC layer 213 converts the m-dimensional feature vector $f_t$ to a one-dimensional value. The FC layer 213 inputs the converted value to a sigmoid function to thereby obtain a one-dimensional weight value (attention) at at the frame t. The FC layer 213 outputs $\alpha_t$.

The FC layer 214 takes as an input the result of calculating the sum of the feature values $\alpha_t f_t$, which are each obtained by weighting the feature value $f_t$ by the attention $\alpha_t$ at the frame t, over all frames of the face video. Then, the FC layer 214 outputs the distribution 400 of emotional elements.

Figure 8:
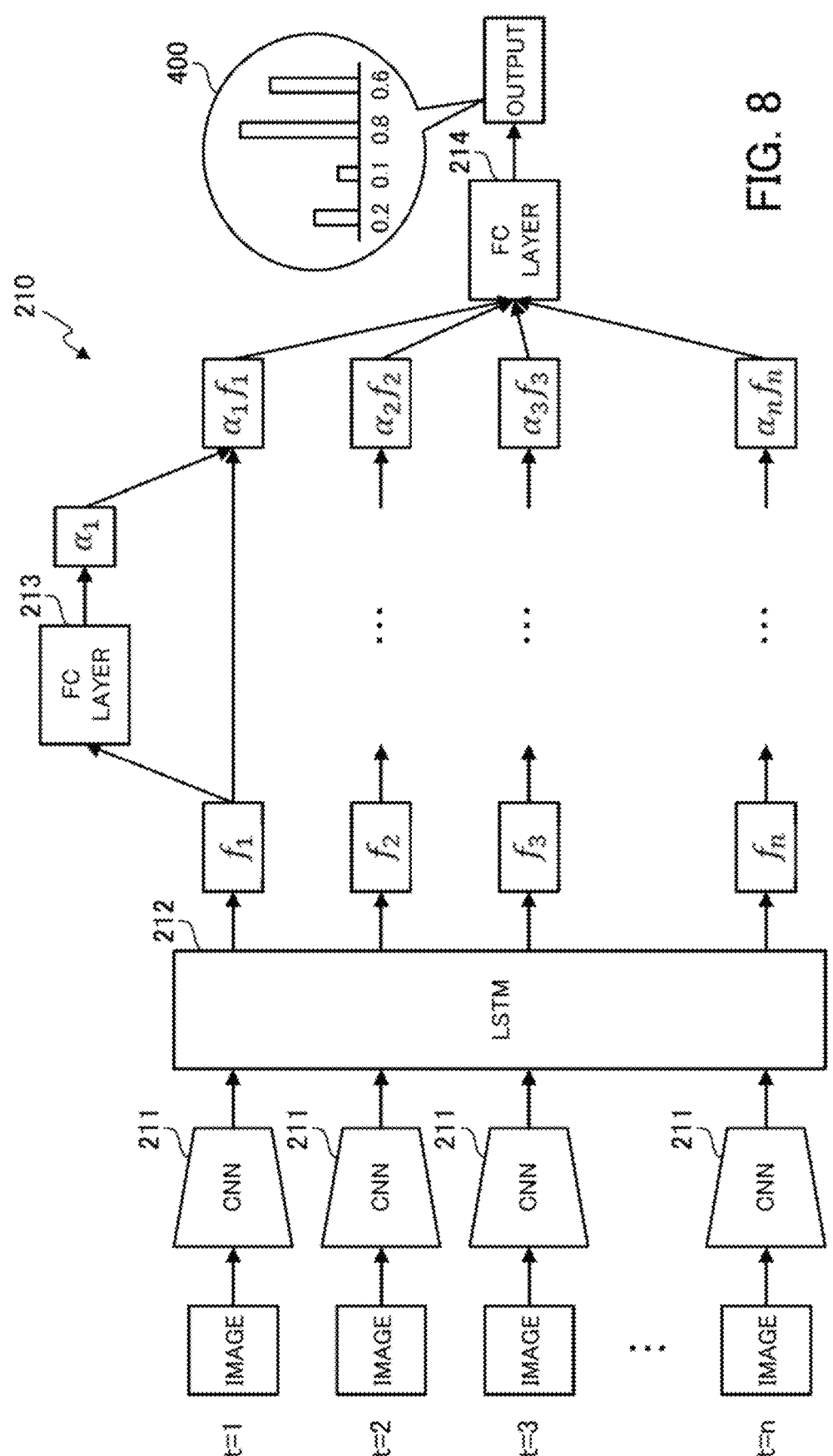
FIG. 8 illustrates an example of the operation of the pre-trained model.

FIG. 8 illustrates an example of the operation of the pre-trained model.

Assume that the total number of frames included in a face video is n. In addition, a common weight is used for each frame in the CNN 211. The pre-trained model 210 processes each frame at the CNN 211, LSTM 212, and FC layer 213, and calculates $\alpha_t f_t$. Then, the pre-trained model 210 calculates the sum of $\alpha_t f_t$ over t=1 to n, inputs the resultant to the FC layer 214, and then outputs the distribution 400 of emotional elements as a final output. In addition, the pre-trained model 210 outputs the attention a t of each frame.

In this connection, the structure of a new recognition model generated by the learning unit 190 as described earlier may be the same as or different from that of the pre-trained model 210. For example, the recognition model generated by the learning unit 190 may include a CNN and LSTM, but does not need to include structural parts corresponding to the FC layer 213 and FC layer 214.

The following describes how the data augmentation unit 180 combines face videos.

Figure 9:
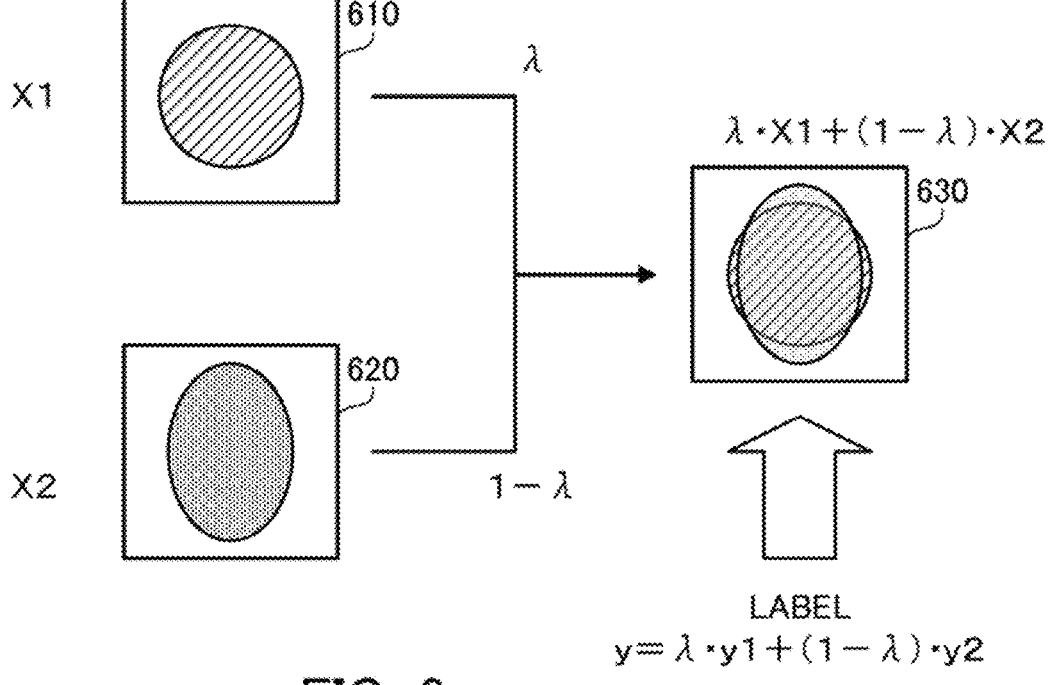
FIG. 9 illustrates an example of alpha blending of two images.

FIG. 9 illustrates an example of alpha blending of two images.

The data augmentation unit 180 performs the alpha blending of frames with the same frame number in two face videos. A set of pixel values in a frame 610 of one face video is taken as X1, and a set of pixel values in a frame 620 of the other face video is taken as X2. In addition, a weight for the frame 610 in the alpha blending is taken as $\lambda$ ($0<\lambda<1$). In this case, a weight for the frame 620 is calculated as $1-\lambda$. The $\lambda$ value may be preset, or alternatively may be randomly determined for a pair of face videos to be combined. The alpha blending is defined by an expression $\lambda \cdot X1+(1-\lambda)\cdot X2$. The data augmentation unit 180 performs the alpha blending of the frames 610 and 620 with the expression, thereby obtaining a composite frame 630 with the frame number in question.

With respect to all frame numbers of the frames included in the two face videos, the data augmentation unit 180 performs the alpha blending of frames with the same frame number, to thereby combine the two face videos. The label y of the composite face video is obtained by calculating the weighted average of the label y1 of the one face video and the label y2 of the other face video using the weight $\lambda$. That is, the label y is calculated as $y=\lambda \cdot y1+(1-\lambda) y2$.

Figure 10:
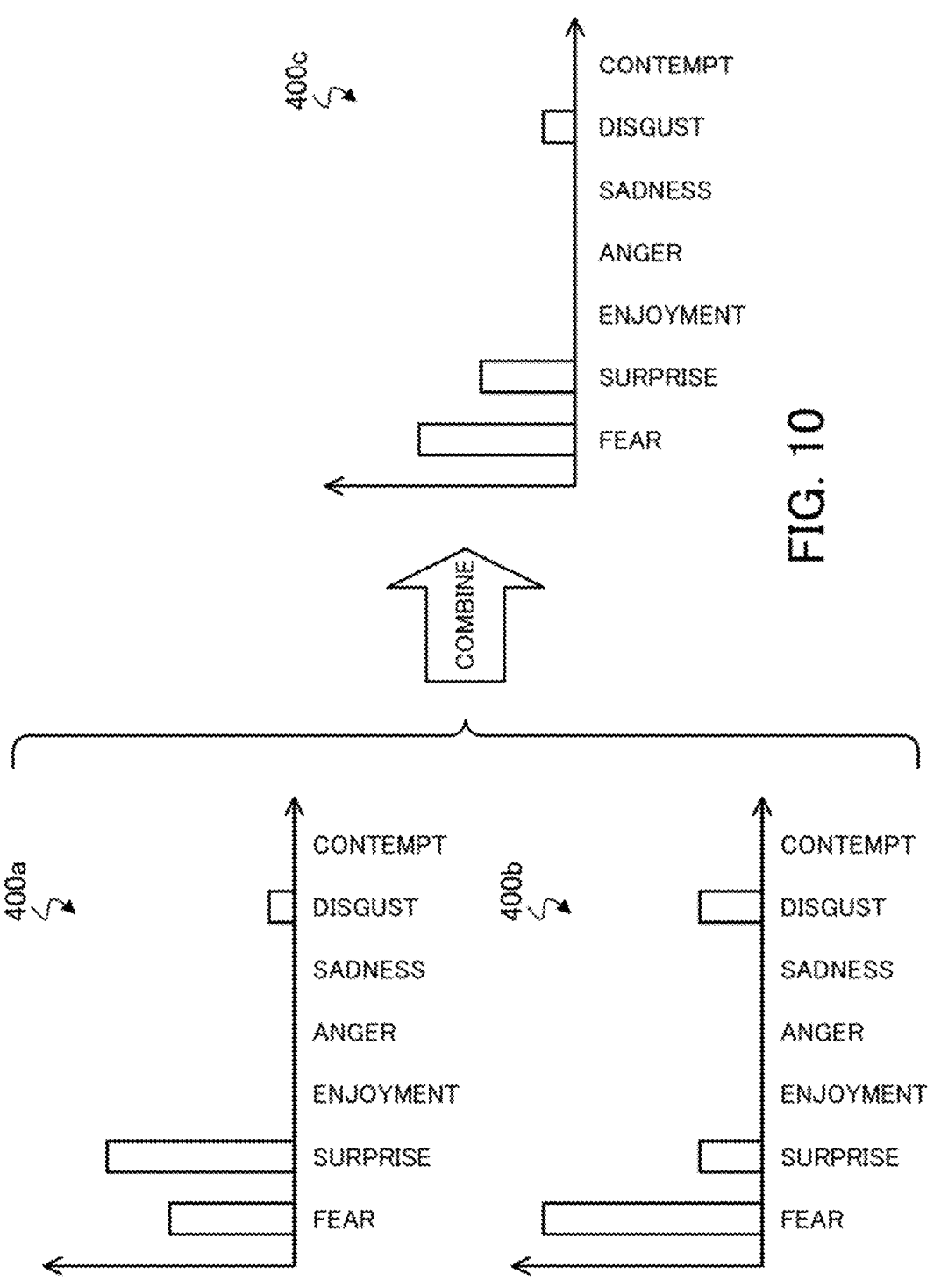
FIG. 10 illustrates an example of combining distributions of emotional elements.

FIG. 10 illustrates an example of combining distributions of emotional elements.

Distributions 400a and 400b exemplify the distributions of emotional elements obtained by the pre-trained model 210 from two face videos, respectively. The distribution 400a is an example of a distribution of emotional elements representing a facial expression "surprise by fear." The distribution 400b is an example of a distribution of emotional elements representing a facial expression "fear."

A distribution 400c is an example result of combining the distributions 400a and 400b. These emotions "surprise by fear" and "fear" are of similar types. Therefore, the distribution 400c is similar to the distributions 400a and 400b.

As described earlier, various emotional elements are mixed in a facial expression, and it is not that the emotional elements corresponding to the facial expression classes are independent of each other. Therefore, there is a possibility that, even when face videos belonging to different facial expression classes are selected and combined, training data that is similar to the combination-source data may be generated.

To avoid this, the machine learning apparatus 100 selects a pair of face videos to be combined, on the basis of the inter-distribution distance between the distributions of emotional elements.

Figure 11:
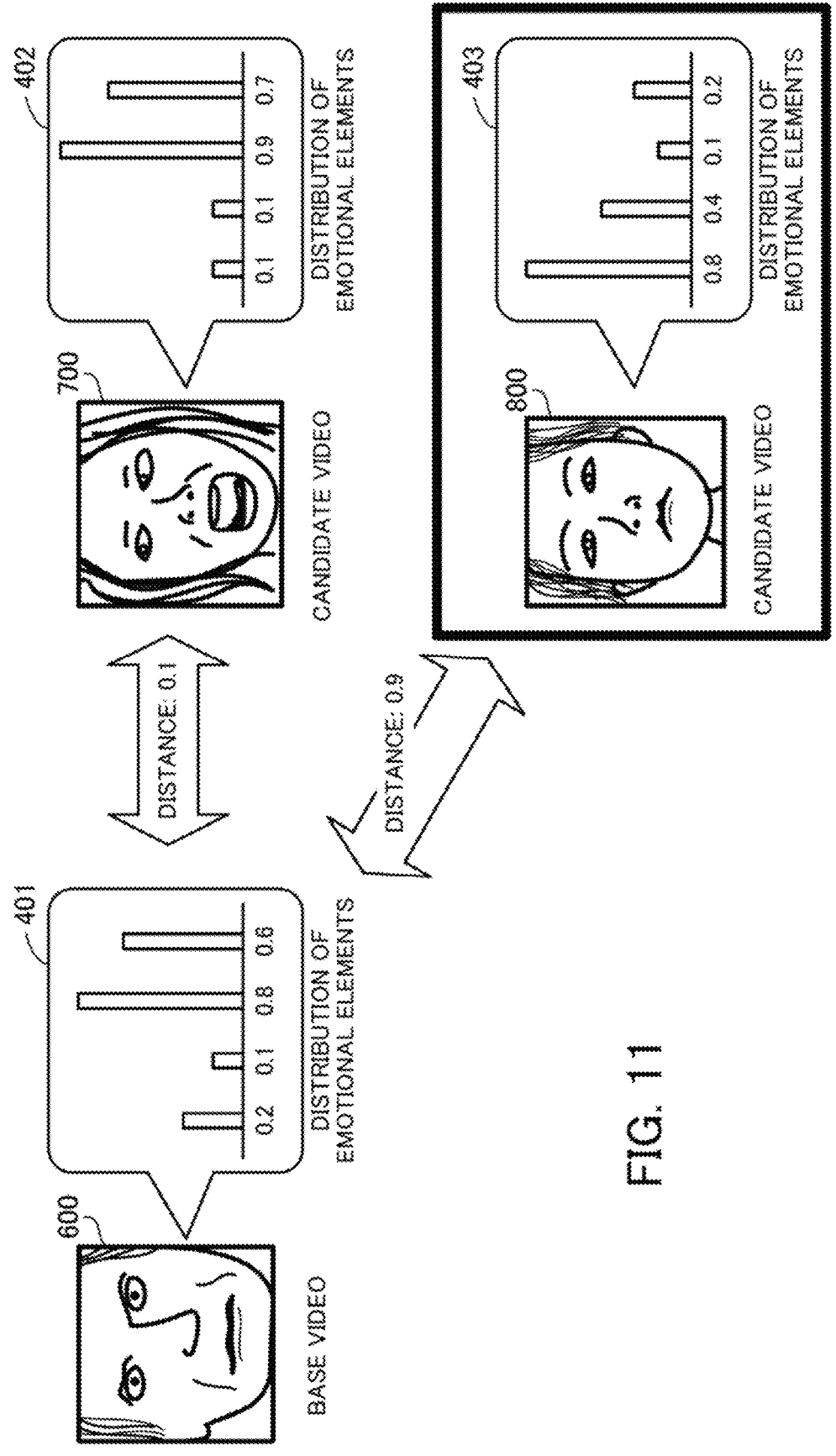
FIG. 11 illustrates a first example of selecting a pair of face videos.

FIG. 11 illustrates a first example of selecting a pair of face videos.

A base video 600 is a certain face video. A distribution 401 of emotional elements is an inference result output by the pre-trained model 210 in response to an input of the base video 600. Candidate videos 700 and 800 are candidates to be paired with the base video 600. Distributions 402 and 403 of emotional elements are inference results output by the pre-trained model 210 in response to inputs of the candidate videos 700 and 800, respectively.

The inter-distribution distance calculation unit 160 calculates an inter-distribution distance on the basis of the vectors representing the distributions 401 and 402. For example, the inter-distribution distance of the distributions 401 and 402 is 0.1. Similarly, the inter-distribution distance calculation unit 160 calculates an inter-distribution distance on the basis of the vectors representing the distributions 401 and 403. For example, the inter-distribution distance of the distributions 401 and 403 is 0.9.

The pair selection unit 170 determines whether to select two face videos as a pair of combination targets, on the basis of a comparison between the inter-distribution distance of the two face videos and a threshold. For example, the threshold is set to 0.5. In this case, the pair selection unit 170 does not select the base video 600 and the candidate video 700 as a pair of combination targets. On the other hand, the pair selection unit 170 selects the base video 600 and the candidate video 800 as a pair of combination targets.

As described above, by combining face videos whose inter-distribution distance is greater than the threshold, the machine learning apparatus 100 is able to reduce the possibility of generating training data that is similar to the combination-source data.

In addition, the machine learning apparatus 100 is able to select a pair of face videos to be combined, on the basis of the attention distance.

Figure 12A:
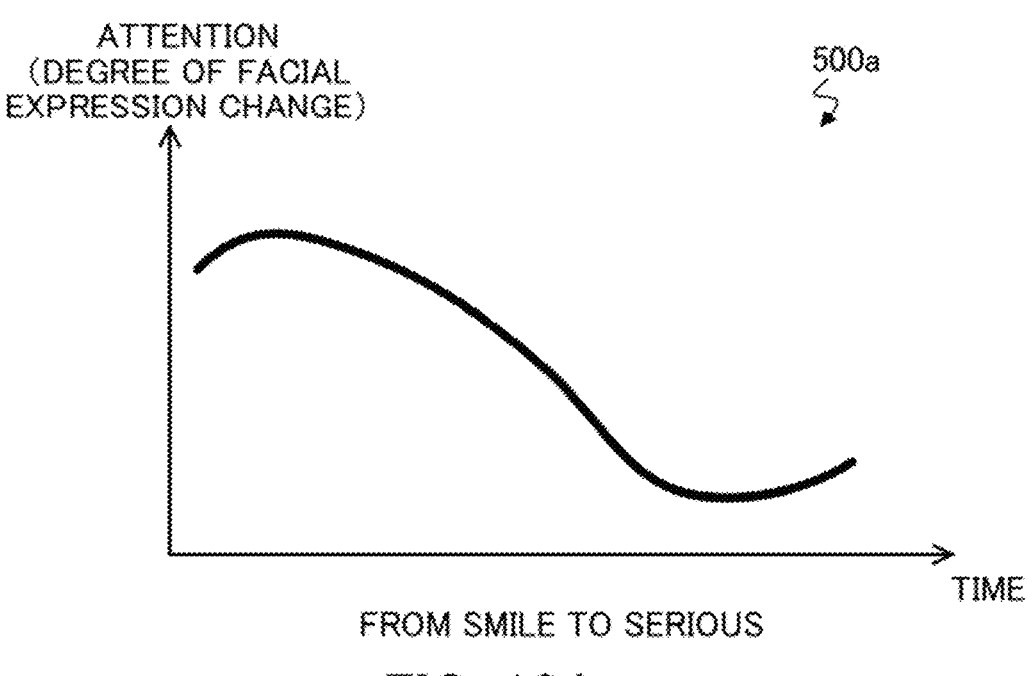
FIGS. 12A and 12B each illustrate an example of facial expression change in a face video.
Figure 12B:
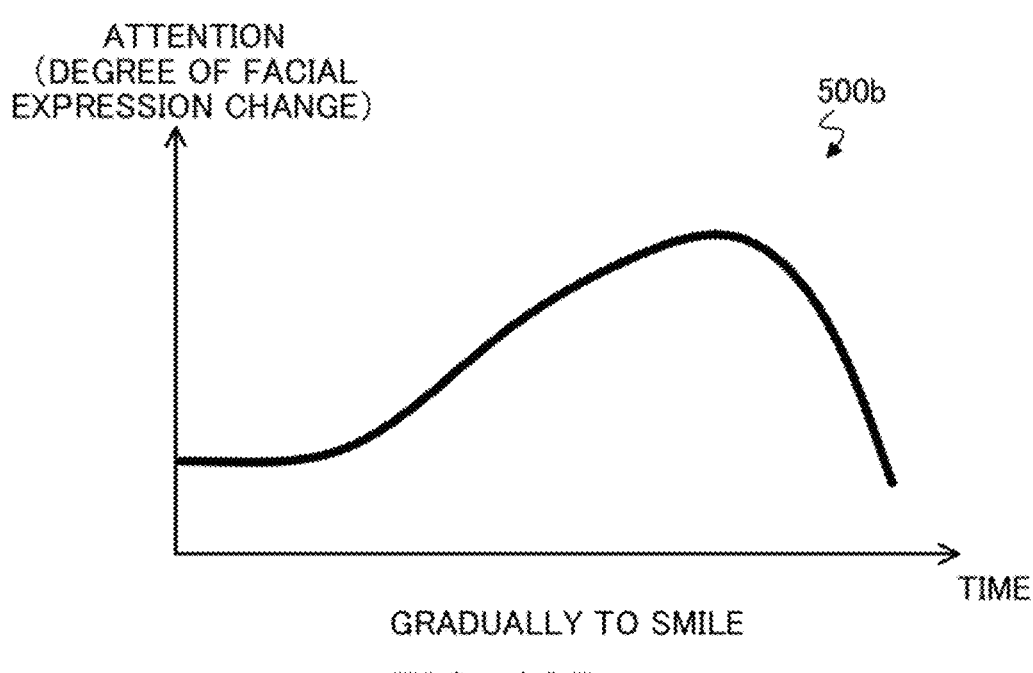

FIGS. 12A and 12B each illustrate an example of facial expression change in a face video.

FIG. 12A illustrates an example of attention information 500a output by the pre-trained model 210 in response to a certain face video. The attention information 500a indicates the attention (the degree of facial expression change) of each frame in a face video capturing a change from smile to serious. FIG. 12B illustrates an example of attention information 500b output by the pre-trained model 210 in response to another face video. The attention information 500b indicates the attention (the degree of facial expression change) of each frame in a face video capturing a change gradually to smile.

The machine learning apparatus 100 is able to specify a pair of face videos that have different temporal changes in facial expression, on the basis of the attention information 500a and 500b.

Figure 13:
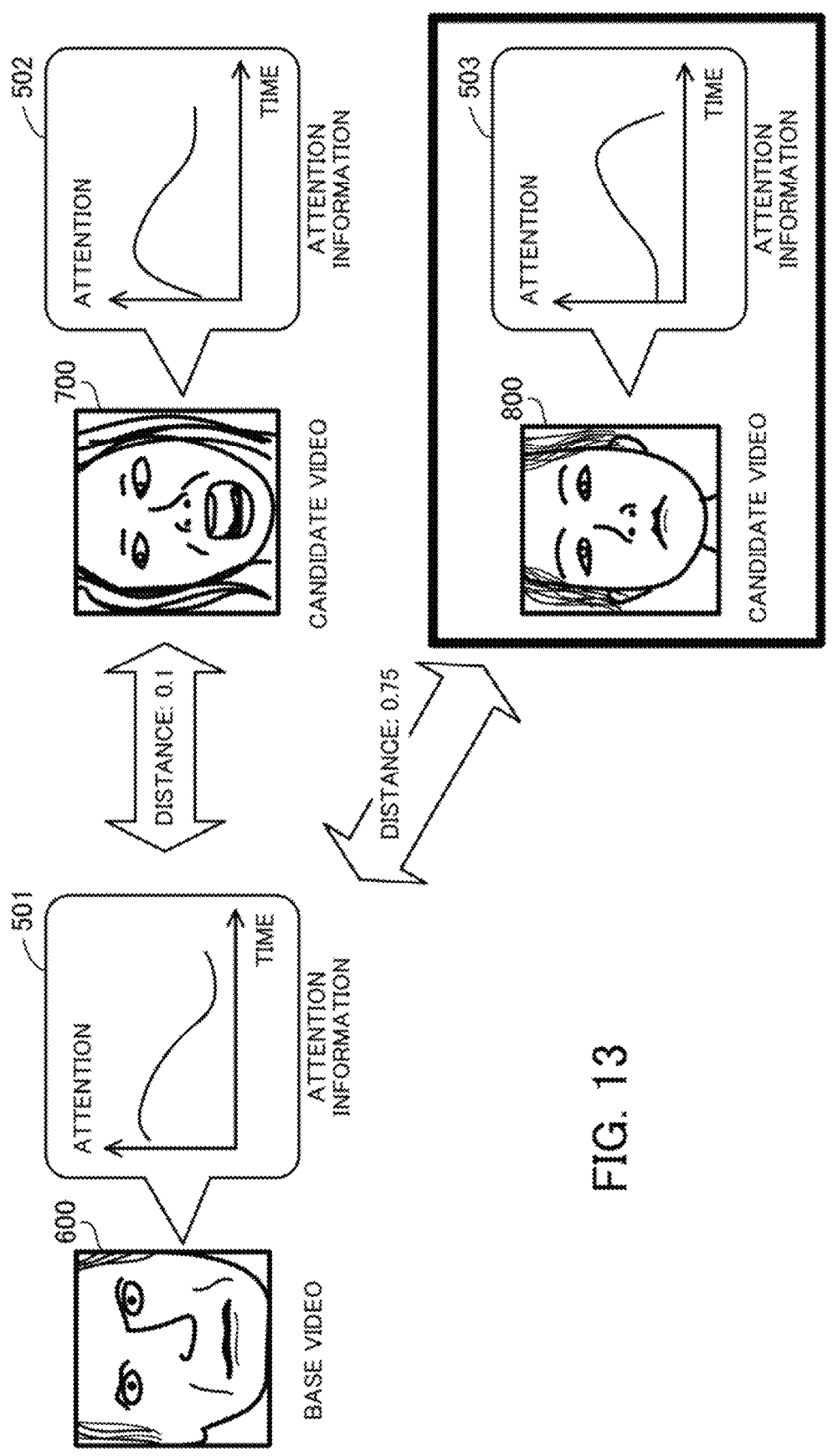
FIG. 13 illustrates a second example of selecting a pair of face videos.

FIG. 13 illustrates a second example of selecting a pair of face videos.

Attention information 501 indicates the attention of each frame included in the base video 600, which is output by the pre-trained model 210 in response to an input of the base video 600. Attention information 502 indicates the attention of each frame included in the candidate video 700, which is output by the pre-trained model 210 in response to an input of the candidate video 700. Attention information 503 indicates the attention of each frame included in the candidate video 800, which is output by the pre-trained model 210 in response to an input of the candidate video 800.

The attention distance calculation unit 160a calculates an attention distance on the basis of the vectors representing the attention information 501 and 502. For example, the attention distance of the attention information 501 and 502 is 0.1.

Similarly, the attention distance calculation unit 160a calculates an attention distance on the basis of the vectors representing the attention information 501 and 503. For example, the attention distance of the attention information 501 and 503 is 0.75.

The pair selection unit 170 compares the attention distance of two face videos with a threshold to determine whether to select the two face videos as a pair of combination targets. For example, the threshold is set to 0.5. In this case, the pair selection unit 170 does not select the base video 600 and the candidate video 700 as a pair of combination targets. On the other hand, the pair selection unit 170 selects the base video 600 and the candidate video 800 as a pair of combination targets. In this connection, the threshold for the attention distance may be different from that for the inter-distribution distance.

As described above, the machine learning apparatus 100 combines face videos whose attention distance is greater than the threshold, so as to reduce the possibility of generating training data that is similar to the combination-source data.

In this connection, the pair selection unit 170 is able to determine whether to select two face videos as a pair of combination targets, using both the inter-distance distribution and attention distance. More specifically, the pair selection unit 170 selects two face videos whose inter-distribution distance and attention distance both exceed the corresponding thresholds, as a pair of combination targets. On the other hand, the pair selection unit 170 does not select, as a pair of combination targets, two face videos at least one of whose inter-distribution distance and attention distance is less than or equal to the corresponding threshold.

Figure 14:
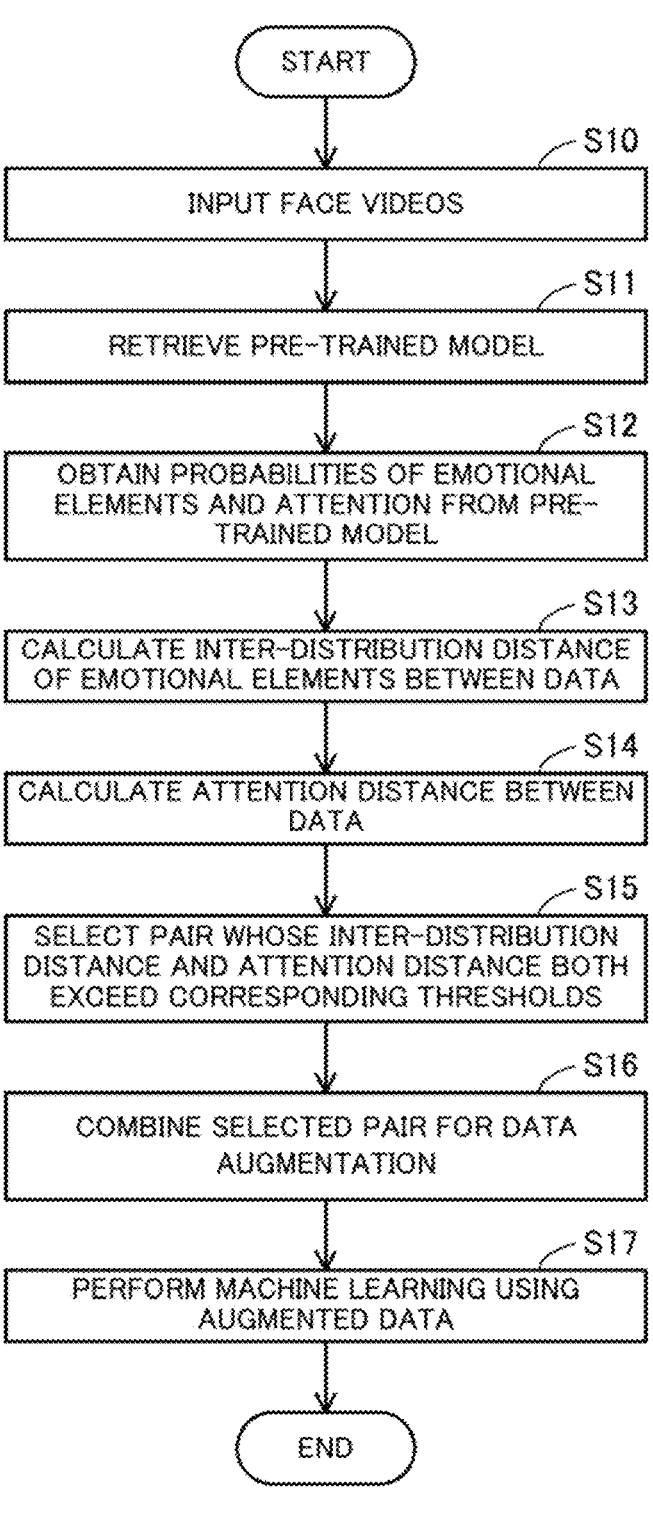
FIG. 14 is a flowchart illustrating an example of a machine learning procedure.

FIG. 14 is a flowchart illustrating an example of a machine learning procedure.

(S10) The input unit 130 inputs a plurality of face videos to the face region extraction unit 140. The face region extraction unit 140 extracts a face region from each face video, and processes each face video to remove information other than the face region. The face region extraction unit 140 inputs the processed face videos to the model output acquisition unit 150 and pair selection unit 170.

(S11) The model output acquisition unit 150 retrieves the pre-trained model 210 from the pre-trained model database 120.

(S12) The model output acquisition unit 150 feeds each face video to the pre-trained model 210 to obtain the probabilities of emotional elements and the attention of each frame from the pre-trained model 210. By doing so, the model output acquisition unit 150 obtains the distribution of emotional elements and the attention information with respect to each face video. The model output acquisition unit 150 outputs the distribution of emotional elements for each face video to the inter-distribution distance calculation unit 160. The model output acquisition unit 150 also outputs the attention information for each face video to the attention distance calculation unit 160a.

(S13) The inter-distribution distance calculation unit 160 calculates the inter-distribution distance of emotional elements between data. More specifically, with respect to every pair of two face videos, the inter-distribution distance calculation unit 160 calculates the Euclidean distance on the basis of vectors representing the distributions of emotional elements of the two face videos, as the inter-distribution distance corresponding to the two face videos.

(S14) The attention distance calculation unit 160a calculates the attention distance between data. More specifically, with respect to every pair of two face videos, the attention distance calculation unit 160a calculates the Euclidean distance on the basis of vectors representing the attention information of the two face videos, as the attention distance corresponding to the two face videos.

(S15) The pair selection unit 170 selects a pair of face videos whose inter-distribution distance and attention distance both exceed the corresponding thresholds, from the pairs of face videos at steps S13 and S14.

(S16) The data augmentation unit 180 combines a pair selected at step S15 for data augmentation. Here, the data augmentation unit 180 combines two face videos with the above-described mixup method. The data augmentation unit 180 calculates the label of the composite face video on the basis of the labels of the two combination-source face videos.

(S17) The learning unit 190 performs machine learning using the augmented data. More specifically, the learning unit 190 performs the machine learning to build a new recognition model of recognizing facial expressions, using training data including the plurality of face videos input at step S10 and the face videos generated respectively for the pairs of two face videos at step S16. Then, the machine learning is completed.

In this connection, at step S15, the pair selection unit 170 may select, as a pair of combination targets, two face videos at least one of whose inter-distribution distance and attention distance exceeds the corresponding preset threshold.

As described above, the machine learning apparatus 100 of the second embodiment is able to improve the generalization performance of the facial expression recognition model. The machine learning apparatus 100 is able to reduce the possibility of combining a pair of similar face videos, by selecting and combining a pair of face videos at least one of whose inter-distribution distance and attention distance is somewhat large. This makes it possible to increase the diversity of the training data efficiently. This in turn improves the generalization performance of the recognition model generated by the machine learning.

Third Embodiment

A third embodiment will now be described. Features different from those of the above-described second embodiment will mainly be described, and the description of the same features will be omitted. A machine learning apparatus of the third embodiment is implemented with the same hardware configuration as that of the second embodiment illustrated in FIG. 2.

Figure 15:
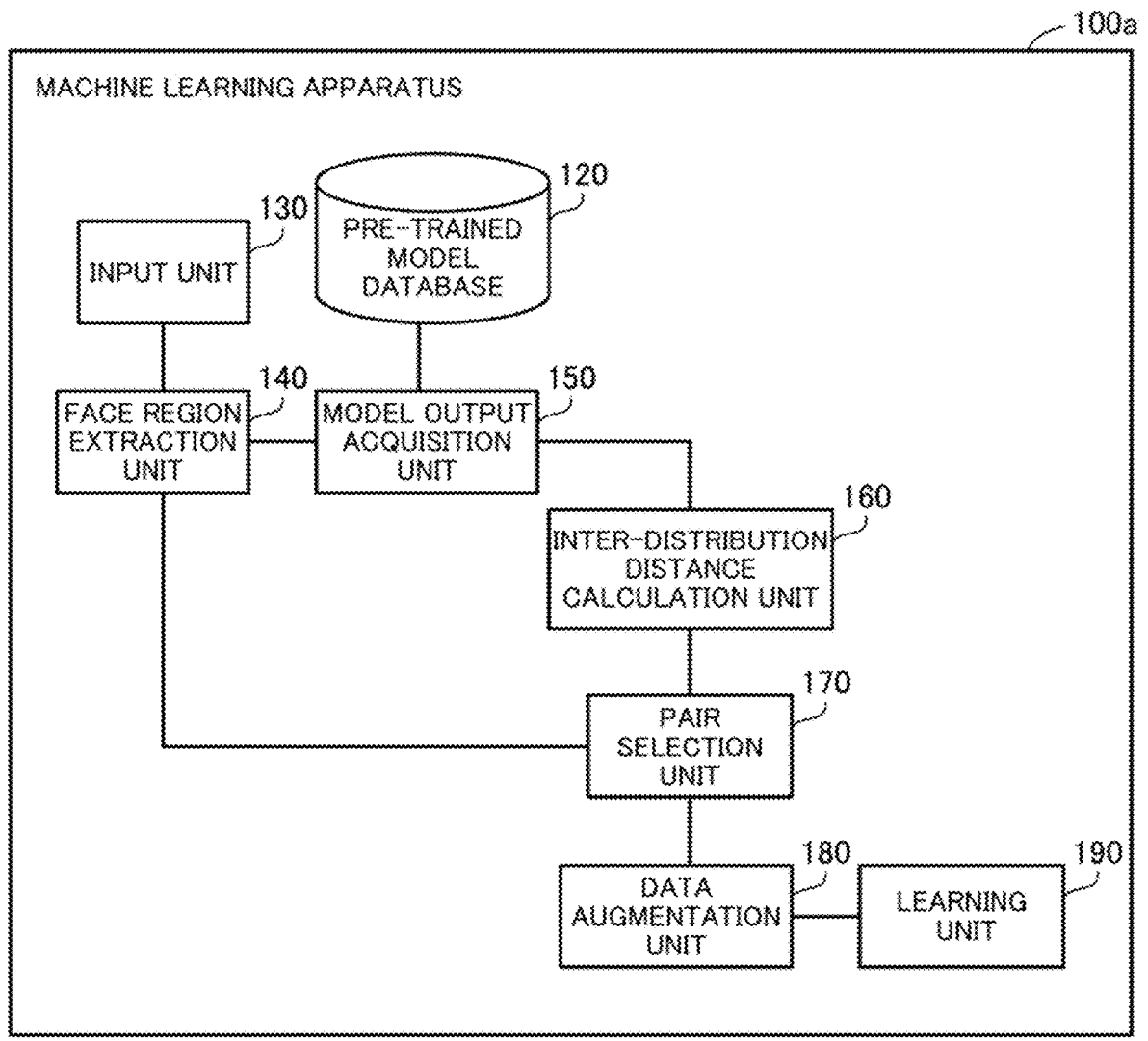
FIG. 15 is a block diagram illustrating an example of functions of a machine learning apparatus according to a third embodiment.

FIG. 15 is a block diagram illustrating an example of functions of the machine learning apparatus according to the third embodiment.

The machine learning apparatus 100a of the third embodiment differs from the machine learning apparatus 100 of the second embodiment in that a pair of face videos are selected as combination targets without using the attention distance.

The machine learning apparatus 100a includes a pre-trained model database 120, an input unit 130, a face region extraction unit 140, a model output acquisition unit 150, an inter-distribution distance calculation unit 160, a pair selection unit 170, a data augmentation unit 180, and a learning unit 190. These functions are the same as those with the same names of the machine learning apparatus 100. The pair selection unit 170, however, selects a pair of face videos as combination targets, on the basis of a comparison between an inter-distribution distance calculated by the inter-distribution distance calculation unit 160 and a threshold.

Figure 16:
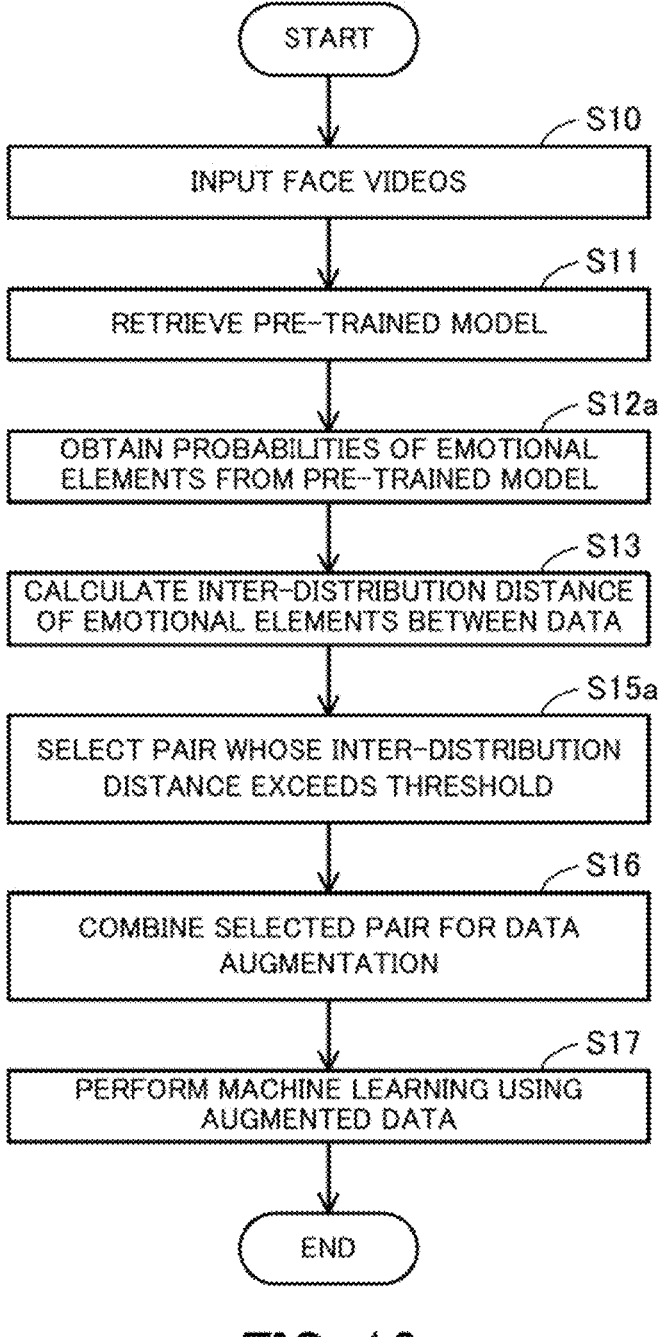
FIG. 16 is a flowchart illustrating an example of a machine learning procedure.

FIG. 16 is a flowchart illustrating an example of a machine learning procedure.

A machine learning procedure of the third embodiment is different from that of the second embodiment in that the machine learning procedure of the third embodiment includes steps S12*a* and S15*a*, which replace steps S12 and S15 of the machine learning procedure of the second embodiment illustrated in FIG. 14. In addition, the machine learning procedure of the third embodiment is different from that of the second embodiment in that the machine learning procedure of the third embodiment executes step S15*a* after step S13, skipping step S14 of the machine learning procedure illustrated in FIG. 14. The other steps of the machine learning procedure of the third embodiment are the same as those of the second embodiment. The following describes steps S12*a* and S15*a*, and the description of the other steps is omitted.

(S12*a*) The model output acquisition unit 150 feeds each face video to the pre-trained model 210 and obtains the probabilities of emotional elements from the pre-trained model 210. Thereby, the model output acquisition unit 150 obtains a distribution of emotional elements for each face video. The model output acquisition unit 150 outputs the distribution of emotional elements for each face video to the inter-distribution distance calculation unit 160. Then, the process proceeds to step S13. After step S13 is executed, the process proceeds to step S15*a*.

(S15*a*) The pair selection unit 170 selects a pair of face videos whose inter-distribution distance exceeds the threshold, from the pairs of two face videos at step S13. Then, the process proceeds to step S16.

As described above, the machine learning apparatus 100*a* selects and combines a pair of face videos whose inter-distribution distance is somewhat large, which enables the possibility of combining a pair of similar face videos to be reduced. Therefore, as in the second embodiment, it is possible to increase the diversity of training data efficiently. This in turn improves the generalization performance of the recognition model generated by the machine learning.

By the way, with the recent advancements in the image processing technology, systems are being developed that detect subtle changes in human mental state from facial expressions and perform processing according to the mental state changes. For example, there is a system that recognizes changes in the facial expression of a communicating person using a camera installed on a robot, detects changes in his/her emotions, and makes appropriate responses.

As one of representative techniques of describing changes in facial expression, there is a method of recognizing facial expressions (for example, happiness, anger, sad, disgust, fear, surprise, contempt, and others) relating to emotions. To achieve such facial expression recognition, the annotation is costly, and it is therefore difficult to scale up data. For this reason, a recognition model needs to be generated from a small amount of data. However, the use of only a small amount of data arises the risk of overfitting to the training data, which leads to low generalization performance (low recognition performance for data other than the training data).

To deal with this, there is considered a method of generating new training data artificially with the above-described mixup method. The use of the mixup method increases the diversity of data artificially, produces a regularization-like effect, and makes it possible to identify even an image in an intermediate state. In addition, the mixture of "different" types of data leads to generating a variety of data, which further improves the effect of the data augmentation and becomes increasingly effective in improving the generalization performance.

It is desirable to mix different data. However, in the case of facial expression recognition with few types of identification targets, the use of an algorithm of randomly selecting data is likely to result in selecting data from the same type of facial expression class. In addition, facial expressions each contain various emotional elements and are therefore not independent of each other. Simply selecting data from different facial expression classes is insufficient in order to select different types of data, and there is a possibility that data of similar type to the original will be generated. For example, as described earlier with respect to the example of the emotion "surprise," "surprise by fear" and "fear" or the like may be mixed, which results in generating data with a distribution of emotional elements similar to that of the original data.

In addition, there are various patterns in how a facial expression changes, and various changes are captured in face videos. From the perspective of mixing different types of data, it is preferable to mix data with different patterns of temporal changes. However, it is not possible to determine the temporal changes from the labels previously given to the face videos, and therefore there is a possibility that similar data will be selected.

As described above, in the conventional methods, similar data may be selected as a pair of combination targets, which leads to generating data of similar type to the original data. This does not contribute to improving the generalization performance.

To deal with this, the above-described machine learning apparatuses 100 and 100*a* use the outputs of an existing model or a pre-trained model to select and combine two types of data (face videos) whose distance calculated based on their corresponding outputs is large. This leads to generating a variety of artificial data, so as to achieve effective data augmentation for improving the generalization performance. In addition, by performing the machine learning to train the existing model or new model using thus augmented training data, it is possible to improve the generalization performance of the model. For example, it is possible to improve the estimation accuracy of emotions, even for relatively small facial expression changes in a face video.

Additionally, the information processing of the first embodiment is implemented by the processing unit 12 running programs. Furthermore, the information processing of the second embodiment is implemented by the CPU 101 running programs. The programs may be stored in the computer-readable storage medium 113.

For example, the programs may be distributed by providing the storage medium 113 on which the programs are stored. Alternatively, the programs may be stored in another computer and may be distributed over a network. For example, a computer may store (install) the programs stored on the storage medium 113 or received from another computer, in a storage device such as the RAM 102 or HDD 103, and read and run the programs from the storage device.

According to one aspect, it is possible to improve the generalization performance.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:

obtaining first inference results respectively corresponding to a plurality of face images, the first inference results being output from a first model of outputting each of the first inference results in response to an input of a corresponding one of the plurality of face images;

selecting, from the plurality of face images, a first face image and a second face image whose distance calculated based on the first inference results corresponding to the first face image and the second face image exceeds a threshold; and performing machine learning to train a second model of outputting a second inference result in response to an input of each of the plurality of face images, using a third face image obtained by combining the first face image and the second face image, wherein each of the plurality of face images is a video capturing facial expression change, each of the first inference results includes a plurality of attention values, and each of the plurality of attention values indicates a degree of a temporal change in a facial expression in each of a plurality of frames included in a corresponding one of the plurality of face images.

2. The non-transitory computer-readable storage medium according to claim 1, wherein each of the first inference results includes a class classification result indicating a probability of each of a plurality of emotional elements estimated from a corresponding one of the plurality of face images.

3. The non-transitory computer-readable storage medium according to claim 2, wherein the processor is configured to select the first face image and the second face image whose first distance calculated based on the class classification result exceeds a first threshold and whose second distance calculated based on the attention values exceeds a second threshold.

4. The non-transitory computer-readable storage medium according to claim 1, wherein each of the first inference results includes a class classification result indicating a probability of each of a plurality of emotional elements estimated from a corresponding one of the plurality of face images, and the selecting of the first face image and the second face image includes selecting the first face image and the second face image whose first distance calculated based on the class classification result exceeds a first threshold and whose second distance calculated based on the plurality of attention values exceeds a second threshold.

5. The non-transitory computer-readable storage medium according to claim 1, wherein:

the process further includes generating the third face image by performing alpha blending of the first face image and the second face image using a first weight of the first face image and a second weight of the second face image, and generating a third label of the third face image by calculating a weighted average of a first label of the first face image and a second label of the second face image using the first weight and the second weight; and the performing of the machine learning includes performing the machine learning to train the second model using training data including the third face image and the third label.

6. A machine learning method comprising:

obtaining, by a processor, first inference results respectively corresponding to a plurality of face images, the first inference results being output from a first model of outputting each of the first inference results in response to an input of a corresponding one of the plurality of face images;

selecting, by the processor, from the plurality of face images, a first face image and a second face image whose distance calculated based on the first inference results corresponding to the first face image and the second face image exceeds a threshold; and performing, by the processor, machine learning to train a second model of outputting a second inference result in response to an input of each of the plurality of face images, using a third face image obtained by combining the first face image and the second face image, wherein each of the plurality of face images is a video capturing facial expression change, each of the first inference results includes a plurality of attention values, and each of the plurality of attention values indicates a degree of a temporal change in a facial expression in each of a plurality of frames included in a corresponding one of the plurality of face images.

7. The machine learning method according to claim 6, wherein each of the first inference results includes a class classification result indicating a probability of each of a plurality of emotional elements estimated from a corresponding one of the plurality of face images, and selecting the first face image and the second face image whose first distance calculated based on the class classification result exceeds a first threshold and whose second distance calculated based on the plurality of attention values exceeds a second threshold.

8. The machine learning method according to claim 6, further comprising:

generating the third face image by performing alpha blending of the first face image and the second face image using a first weight of the first face image and a second weight of the second face image; and generating a third label for the third face image by calculating a weighted average of a first label of the first face image and a second label of the second face image using the first weight and the second weight, wherein performing of the machine learning includes training the second model using the third face image and the third label as training data.

9. The machine learning method according to claim 6, wherein each of the first inference results includes a class classification result indicating a probability of each of a plurality of emotional elements estimated from a corresponding one of the plurality of face images.

10. The machine learning method according to claim 9, wherein the processor is configured to select the first face image and the second face image whose first distance calculated based on the class classification result exceeds a first threshold and whose second distance calculated based on the attention values exceeds a second threshold.

11. A machine learning apparatus comprising:

a memory that stores therein first inference results respectively corresponding to a plurality of face images, the first inference results being output from a first model of outputting each of the first inference results in response to an input of a corresponding one of the plurality of face images; and a processor coupled to the memory and the processor configured to:

select, from the plurality of face images, a first face image and a second face image whose distance calculated based on the first inference results corresponding to the first face image and the second face image exceeds a threshold; and perform machine learning to train a second model of outputting a second inference result in response to an input of each of the plurality of face images, using a third face image obtained by combining the first face image and the second face image, wherein each of the plurality of face images is a video capturing facial expression change, each of the first inference results includes a plurality of attention values, and each of the plurality of attention values indicates a degree of a temporal change in a facial expression in each of a plurality of frames included in a corresponding one of the plurality of face images.

12. The machine learning apparatus according to claim 11, wherein each of the first inference results includes a class classification result indicating a probability of each of a plurality of emotional elements estimated from a corresponding one of the plurality of face images, and the processor is configured to select the first face image and the second face image whose first distance calculated based on the class classification result exceeds a first threshold and whose second distance calculated based on the plurality of attention values exceeds a second threshold.

13. The machine learning apparatus according to claim 11, wherein the processor is further configured to:

generate the third face image by performing alpha blending of the first face image and the second face image using a first weight of the first face image and a second weight of the second face image; and generate a third label for the third face image by calculating a weighted average of a first label of the first face image and a second label of the second face image using the first weight and the second weight, wherein performing of the machine learning includes training the second model using the third face image and the third label as training data.

14. The machine learning apparatus according to claim 11, wherein each of the first inference results includes a class classification result indicating a probability of each of a plurality of emotional elements estimated from a corresponding one of the plurality of face images.

15. The machine learning apparatus according to claim 14, wherein the processor is configured to select the first face image and the second face image whose first distance calculated based on the class classification result exceeds a first threshold and whose second distance calculated based on the attention values exceeds a second threshold.

* * * * *